US012712127B2

(12) United States Patent
Han

(10) Patent No.: US 12,712,127 B2
(45) Date of Patent: Aug. 18, 2026

(54) CERAMIC CAPACITOR WITH PREVENTION PORTIONS ON END ELECTRODES

(71) Applicant: SAMSUNG ELECTRONICS CO., LTD., Suwon-si (KR)

(72) Inventor: Sunwoo Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 71 days.

(21) Appl. No.: 18/676,986

(22) Filed: May 29, 2024

(65) Prior Publication Data

US 2025/0014825 A1 Jan. 9, 2025

(30) Foreign Application Priority Data

Jul. 3, 2023 (KR) ........................ 10-2023-0085986

(51) Int. Cl.

*H01G 4/232* (2006.01)
*H01G 2/06* (2006.01)
*H01G 4/30* (2006.01)

(52) U.S. Cl.

CPC ............. *H01G 4/232* (2013.01); *H01G 2/065* (2013.01); *H01G 4/30* (2013.01)

(58) Field of Classification Search

None
See application file for complete search history.

(56) References Cited

U.S. PATENT DOCUMENTS 6,566,611 B2 5/2003 Kochanowski et al.
6,710,444 B2 3/2004 Xie et al.
6,838,313 B2 1/2005 Kumamoto et al.
8,878,339 B2 11/2014 Hattori et al.
9,214,278 B2 12/2015 Park et al.
9,520,233 B2 12/2016 Jun et al.
10,049,961 B1 8/2018 Qi et al.
10,283,443 B2 5/2019 Liao et al.
2011/0175218 A1 7/2011 Liou et al.
2013/0050894 A1* 2/2013 Ahn ......................... H01G 4/12 361/306.3
2018/0323010 A1* 11/2018 Park ....................... H01G 2/065
2019/0066926 A1* 2/2019 Onoue ................... H01G 4/248
2019/0103224 A1* 4/2019 Han ..................... H01G 4/2325
2019/0318874 A1* 10/2019 Orimo .................... H05K 1/181
2021/0280374 A1* 9/2021 Nishikawa ............. H05K 1/181
2023/0104369 A1* 4/2023 Serita ....................... H01G 4/30 174/260

(Continued)

FOREIGN PATENT DOCUMENTS

JP 01283809 A * 11/1989
JP H0737753 A * 2/1995

(Continued)

*Primary Examiner* — Eric W Thomas
(74) *Attorney, Agent, or Firm* — Fish & Richardson P.C.

(57) ABSTRACT

Provided is a capacitor including a ceramic main body, an internal electrode inside the ceramic main body, and a plurality of external electrodes respectively on a first surface and a second surface that are opposite to each other in a horizontal direction of the ceramic main body. Each of the plurality of external electrodes includes one or more prevention portions protruding in an outward direction of the ceramic main body or recessed in an inward direction of the ceramic main body.

18 Claims, 9 Drawing Sheets

(56) References Cited

U.S. PATENT DOCUMENTS

| | | | | |
|---|---|---|---|---|
| 2023/0284388 | A1* | 9/2023 | Chen | H01C 1/01<br>174/260 |

FOREIGN PATENT DOCUMENTS

| | | | | |
|---|---|---|---|---|
| JP | 2007281134 | A | * | 10/2007 |
| JP | 2014045055 | A | * | 3/2014 |
| KR | 10-2012-0127460 | | | 11/2012 |
| KR | 10-1688081 | | | 12/2016 |
| KR | 10-2139760 | | | 7/2020 |
| KR | 10-2306713 | | | 9/2021 |

* cited by examiner

CERAMIC CAPACITOR WITH PREVENTION PORTIONS ON END ELECTRODES

CROSS-REFERENCE TO RELATED APPLICATION

This application claims priority under 35 U.S.C. § 119 to Korean Patent Application No. 10-2023-0085986, filed on Jul. 3, 2023, in the Korean Intellectual Property Office, the disclosure of which is incorporated by reference herein in its entirety.

BACKGROUND

Electronic devices using ceramic materials include capacitors, inductors, piezoelectric elements, varistors, thermistors, or the like. A multi-layered ceramic capacitor (MLCC) among such ceramic electronic devices has the advantages of small size, high capacity, and easy mounting. An MLCC is widely used as a component for electronic devices, such as computers, portable phones, and control modules, due to the above characteristics. Recently, as the electronic devices have become miniaturized and more multi-functional, chip components have also become smaller and multi-functional, and thus, MLCCs that have a small size and a large capacity are in demand.

In particular, in a semiconductor package structure using an embedded trace substrate (ETS), a pad may be buried in an insulating layer, such as a prepreg layer, and a passive device, such as a capacitor, may be connected thereon. Therefore, a clearance for molding between the capacitor and the prepreg layer may be very low, and in a molding process, a void or the like may occur in a lower region of the capacitor.

SUMMARY

The subject matter of this disclosure relates to a capacitor including an external electrode with a prevention portion.

The subject matter of this disclosure also relates to an electronic device on which a capacitor including an external electrode with a prevention portion is mounted.

According to an aspect of the present disclosure, there is provided a capacitor including a ceramic main body, an internal electrode inside the ceramic main body, and a plurality of external electrodes respectively on a first surface and a second surface that are opposite to each other in a horizontal direction of the ceramic main body, wherein each of the plurality of external electrodes includes one or more prevention portions protruding in an outward direction of the ceramic main body or recessed in an inward direction of the ceramic main body.

According to another aspect of the present disclosure, there is provided a capacitor including a ceramic main body including a plurality of dielectric layers stacked in a vertical direction, a plurality of internal electrodes alternately disposed with the plurality of dielectric layers inside the ceramic main body, and an external electrode including a first external electrode on a first surface of the ceramic main body and a second external electrode on a second surface that is opposite to the first surface in a horizontal direction, wherein the first external electrode includes one or more first prevention portions protruding in an outward direction of the ceramic main body or recessed in an inward direction of the ceramic main body, and the second external electrode includes one or more second prevention portions protruding in the outward direction of the ceramic main body or recessed in the inward direction of the ceramic main body.

According to another aspect of the present disclosure, there is provided an electronic device with a capacitor mounted thereon, including a substrate including a core layer and an insulating layer formed on the core layer, an electrode pad embedded in the insulating layer, a solder resist coated on the substrate and forming an open area on the substrate, the capacitor on the substrate, and a solder connecting the substrate to the capacitor, wherein the capacitor includes a ceramic main body, an internal electrode inside the ceramic main body, and a plurality of external electrodes respectively on a first surface of the ceramic main body and a second surface that is opposite to the first surface and connected to the electrode pad through the solder, wherein each of the plurality of external electrodes includes one or more prevention portions protruding in an outward direction of the ceramic main body or recessed in an inward direction of the ceramic main body.

BRIEF DESCRIPTION OF THE DRAWINGS

Embodiments of the present disclosure will be more clearly understood from the following detailed description taken in conjunction with the accompanying drawings in which.

DETAILED DESCRIPTION

Figure 1:
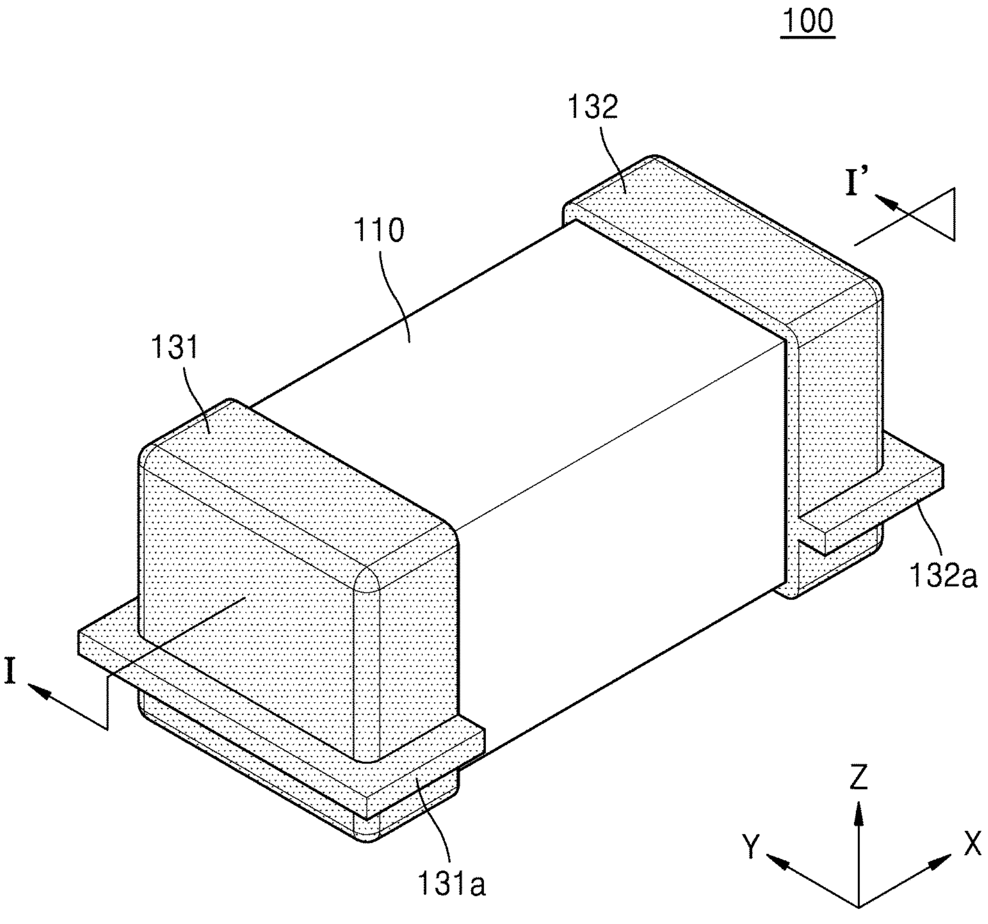
FIG. 1 is a perspective view illustrating a capacitor according to some embodiments.

Hereinafter, embodiments will be described in detail with reference to the accompanying drawings. Like reference numerals in the drawings denote like elements, and thus their repetitive description is omitted.

FIG. 1 is a perspective view illustrating a capacitor 100 according to some embodiments.

Figure 2:
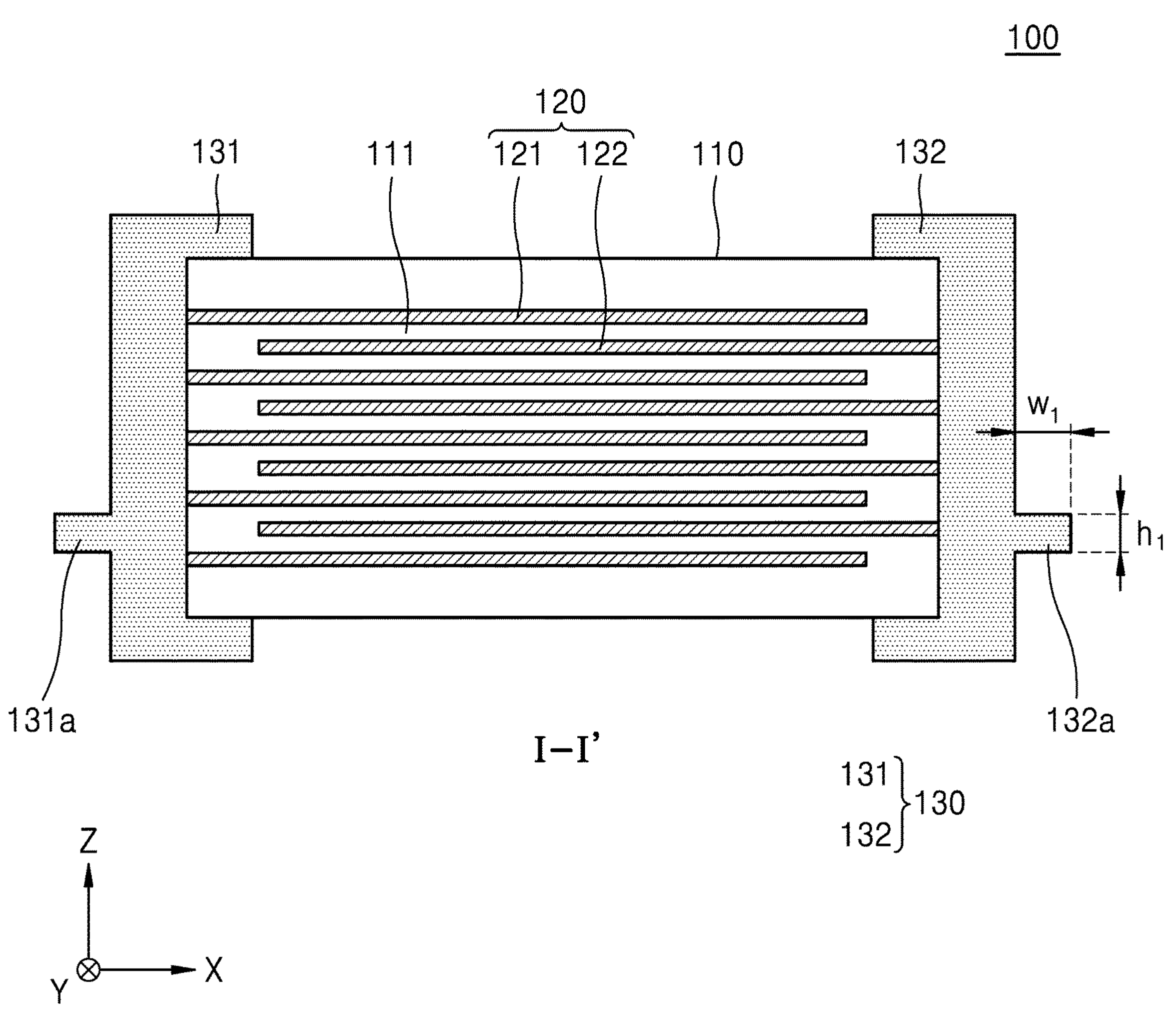
FIG. 2 is a cross-sectional view of the capacitor taken along line I-I' of FIG. 1.

FIG. 2 is a cross-sectional view of the capacitor 100 taken along line I-I' of FIG. 1.

The capacitor 100 according to some embodiments may be a multi-layered ceramic capacitor (MLCC). In particular, the capacitor 100 may be a two-terminal vertically laminated or vertical multilayer capacitor but is not limited thereto. Vertically laminated or vertical multilayer may indicate that internal electrodes stacked in the capacitor 100 are vertically disposed on a mounting area surface of a circuit board, and two-terminal may indicate that two terminals are connected as terminals of the capacitor 100 to the circuit board.

Referring to FIGS. 1 and 2, the capacitor 100 according to some embodiments includes a ceramic main body 110, an internal electrode 120, and an external electrode 130. The internal electrode 120 may be inside the ceramic main body 110, and the external electrode 130 may be on one surface of the ceramic main body 110.

The ceramic main body 110 may include an active layer as a portion contributing to capacity formation of the capacitor 100 and upper and lower cover layers as upper and lower margin regions respectively formed on and beneath the active layer. The active layer may include a dielectric layer 111 and the internal electrode 120.

According to some embodiments, the ceramic main body 110 is not particularly limited to the shape thereof but may substantially have a hexahedral shape. When a chip is sintered, the ceramic main body 110 may not have a perfect hexahedral shape due to a thickness difference according to sintering contraction of ceramic powder and the existence of the pattern of the internal electrode 120 and polishing of an edge region of the ceramic main body 110 but may have a shape substantially close to a hexahedron.

If the directions of a hexahedron are defined, an X direction, a Y direction, and a Z direction shown on the drawings indicate a length direction, a width direction, and a thickness direction, respectively. Herein, the thickness direction may be substantially the same as a stacking direction in which the dielectric layer 111 is stacked. Hereinafter, it is described in the specification that the X direction is defined as a first horizontal direction, the Y direction is defined as a second horizontal direction, and the Z direction is defined as the vertical direction.

The ceramic main body 110 may be formed by stacking a plurality of dielectric layers 111 in the vertical direction (the Z direction). The plurality of dielectric layers 111 constituting the ceramic main body 110 are in a sintered state and may be integrated such that a boundary between adjacent dielectric layers 111 cannot be identified.

The dielectric layer 111 may be formed by plasticity of a ceramic green sheet including ceramic powder, an organic solvent, and an organic binder. The ceramic powder is a material having a high dielectric constant and may include barium titanium oxide (BaTiO3)-based or strontium titanium oxide (SrTiO3)-based powder but is not limited thereto.

According to some embodiments, the internal electrode 120 may be formed inside the ceramic main body 110. The internal electrode 120 includes a first internal electrode 121 and a second internal electrode 122. The first internal electrode 121 and the second internal electrode 122 may face each other with the dielectric layer 111 therebetween. The first internal electrode 121 and the second internal electrode 122 are a pair of electrodes having different polarities and may be formed with a certain thickness on the dielectric layer 111.

In addition, the first internal electrode 121 and the second internal electrode 122 may be formed to be alternately exposed toward both end surfaces of the ceramic main body 110 in the stacking direction of the dielectric layer 111. The first internal electrode 121 and the second internal electrode 122 may be electrically isolated from each other by the dielectric layer 111 therebetween.

The internal electrode 120 may be electrically connected to the external electrode 130 through portions alternately exposed toward both the end surfaces of the ceramic main body 110. More particularly, the external electrode 130 includes a first external electrode 131 and a second external electrode 132, the first internal electrode 121 may be electrically connected to the first external electrode 131, and the second internal electrode 122 may be electrically connected to the second external electrode 132.

If a voltage is applied to the first external electrode 131 and the second external electrode 132, charges may be accumulated between the first internal electrode 121 and the second internal electrode 122 facing each other. In this case, the capacitance of the capacitor 100 may be proportional to the area of a region in which the first internal electrode 121 overlaps the second internal electrode 122.

The thickness of the first internal electrode 121 and the second internal electrode 122 may be determined according to usages thereof. In this case, the thickness of the dielectric layer 111 may be arbitrary changed to meet a capacity design of the capacitor 100.

The first internal electrode 121 and the second internal electrode 122 may include a conductive metal. For example, the conductive metal may be nickel (Ni), copper (Cu), tin (Sn), palladium (Pd), gold (Au), or an alloy thereof but is not limited thereto. In some embodiments, the first internal electrode 121 and the second internal electrode 122 may be sintered electrodes formed by sintering a paste including the conductive metal.

A top region and a bottom region of the dielectric layer 111 may have the same material and configuration as the other regions of the dielectric layer 111 except that the internal electrode 120 is not included. Each of the top region and the bottom region may be formed by a single dielectric layer or by stacking two or more dielectric layers in the vertical direction (the Z direction). In addition, the top region and the bottom region may prevent a loss of the first internal electrode 121 and the second internal electrode 122 by physical or chemical stress.

According to some embodiments, the external electrode 130 includes the first external electrode 131 and the second external electrode 132. The first external electrode 131 and the second external electrode 132 may be directly connected to the first internal electrode 121 and the second internal electrode 122, respectively, to ensure electrical conduction between the inside and the outside.

For example, the first external electrode 131 and the second external electrode 132 may include a conductive metal. For example, the conductive metal may be Ni, Cu, Sn, Pd, Au, or an alloy thereof but is not limited thereto. In some embodiments, the first external electrode 131 and the second external electrode 132 may be sintered electrodes formed by sintering a paste including the conductive metal. The conductive paste may further include an insulating material. For example, the insulating material may be glass but is not limited thereto.

It is described in the specification that, with reference to the external electrode 130, a direction in which the ceramic main body 110 is present is defined as an inward direction and a direction in which the ceramic main body 110 is not present is defined as an outward direction.

According to some embodiments, the external electrode 130 may be at both side surfaces of the ceramic main body 110 to be connected to the internal electrode 120. For example, the first external electrode 131 may be formed on a first surface of the ceramic main body 110 to be connected to the first internal electrode 121. The second external electrode 132 may be formed on a second surface of the ceramic main body 110 to be connected to the second internal electrode 122. In this case, the second surface may be an opposite surface to the first surface of the ceramic main body 110 in the first horizontal direction (the X direction).

According to some embodiments, each of the first external electrode 131 and the second external electrode 132 may extend to one or more surfaces among the upper and lower surfaces, both the end surfaces, and the side surfaces of the ceramic main body 110. Therefore, the first external electrode 131 may be formed to surround one or more surfaces among the upper and lower surfaces, both the end surfaces, and the side surfaces of the ceramic main body 110 while being connected to the first internal electrode 121 exposed to the first surface of the ceramic main body 110. The second external electrode 132 may be formed to surround one or more surfaces among the upper and lower surfaces, both the end surfaces, and the side surfaces of the ceramic main body 110 while being connected to the second internal electrode 122 exposed to the second surface of the ceramic main body 110.

In this case, a method of forming the first external electrode 131 and the second external electrode 132 may include forming the same by coating the ceramic main body 110 with an external electrode paste or forming the same by using another method, such as plating.

According to some embodiments, the external electrode 130 includes one or more prevention portions 131*a* and 132*a* each protruding in the outward direction of the ceramic main body 110 or recessed in the inward direction of the ceramic main body 110.

Referring to FIG. 2, a prevention portion 131*a* and 132*a* of the capacitor 100 according to some embodiments includes a first prevention portion 131*a* and a second prevention portion 132*a*. The first prevention portion 131*a* may be provided to the first external electrode 131. The second prevention portion 132*a* may be provided to the second external electrode 132. Particularly, the first prevention portion 131*a* may protrude in the outward direction of the ceramic main body 110 with respect to the first surface of the ceramic main body 110. In addition, the second prevention portion 132*a* may protrude in the outward direction of the ceramic main body 110 with respect to the second surface of the ceramic main body 110.

According to some embodiments, the first prevention portion 131*a* and the second prevention portion 132*a* may be formed at the same level in the vertical direction (the Z direction). Particularly, the height from the lower surface of the first external electrode 131 to the first prevention portion 131*a* may be the same as the height from the lower surface of the second external electrode 132 to the second prevention portion 132*a*. However, the first prevention portion 131*a* and the second prevention portion 132*a* are not limited thereto and may be at different levels. For example, the height from the lower surface of the first external electrode 131 to the first prevention portion 131*a* may be greater or less than the height from the lower surface of the second external electrode 132 to the second prevention portion 132*a*.

According to some embodiments, the first prevention portion 131*a* may be parallel to the second prevention portion 132*a*. The first prevention portion 131*a* and the second prevention portion 132*a* may be parallel to each other and to the first horizontal direction (the X direction) and the second horizontal direction (the Y direction) of the ceramic main body 110. However, the first prevention portion 131*a* and the second prevention portion 132*a* are not limited thereto and may have a shape inclined at a certain angle with respect to the first horizontal direction (the X direction) or the second horizontal direction (the Y direction) of the ceramic main body 110. For example, as the first prevention portion 131*a* and the second prevention portion 132*a* are away from the ceramic main body 110, the heights of the first prevention portion 131*a* and the second prevention portion 132*a* in the vertical direction (the Z direction) may decrease. Alternatively, as the first prevention portion 131*a* and the second prevention portion 132*a* are away from the ceramic main body 110, the heights of the first prevention portion 131*a* and the second prevention portion 132*a* in the vertical direction (the Z direction) may increase.

According to some embodiments, the prevention portion 131*a* and 132*a* may protrude with a certain height $h_1$ and depth $w_1$ in the outward direction of the ceramic main body 110. In this case, the height $h_1$ and depth $w_1$ of the prevention portion 131*a* and 132*a* may be formed in a range of about tens of micrometers (μm). The height and depth of the first prevention portion 131*a* may be the same as the height and depth of the second prevention portion 132*a*, respectively, but are not limited thereto.

Figure 3:
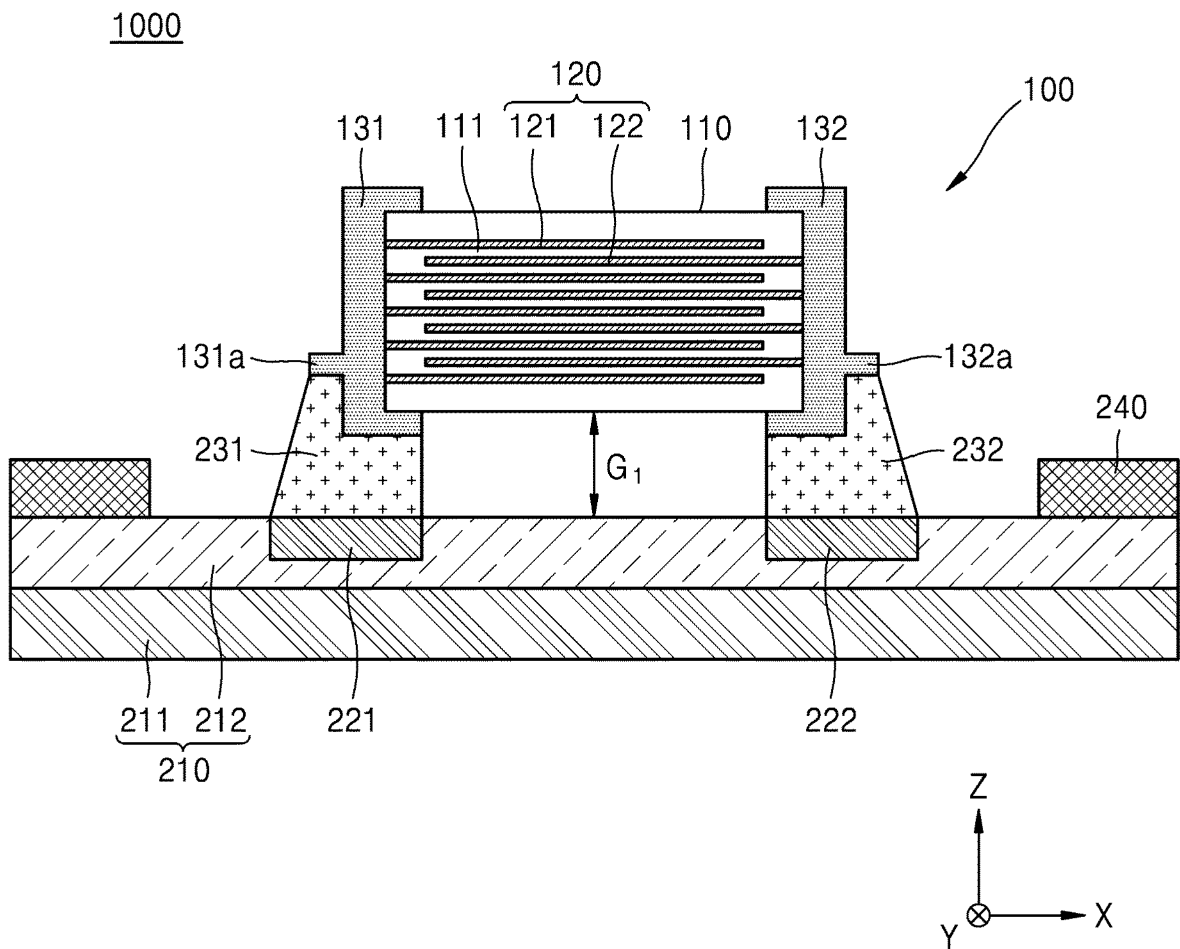
FIG. 3 is a cross-sectional view illustrating an electronic device with the capacitor of FIG. 2 mounted thereon, according to some embodiments.

FIG. 3 is a cross-sectional view illustrating an electronic device 1000 with the capacitor 100 of FIG. 2 mounted thereon, according to some embodiments.

Referring to FIG. 3, the electronic device 1000 with the capacitor 100 mounted thereon, according to some embodiments, includes the capacitor 100, a substrate 210, a plurality of solders, e.g., first and second solders 231 and 232, and a solder resist 240.

The substrate 210 includes a core layer 211 and an insulating layer 212. The substrate 210 may have wiring portions formed thereon, and the wiring portions on the substrate 210 may be electrically connected to the capacitor 100 through a connection terminal. In addition, the substrate 210 may have a port thereon. The substrate 210 may be mounted on a module substrate, a system board, a mainboard, or the like by being electrically connected thereto through the port.

A multi-layered or single-layered wiring portion may be formed in the core layer 211, and the core layer 211 may be electrically connected to the capacitor 100 through the wiring portion. In addition, the core layer 211 may be commonly implemented by compressing a polymer material, such as a thermosetting resin, an epoxy-based resin, such as flame retardant 4 (FR-4), bismaleimide triazine (BT), or Ajinomoto build up film (ABF), a phenol resin, or the like to a certain thickness to form a thin film, coating a Cu foil on both surfaces of the thin film, and then forming, through patterning, a wiring portion that is a transfer path of an electrical signal. In addition, the substrate 210 may further include a lower protective layer (not shown) protecting the core layer 211. For example, the lower protective layer may be formed of a solder resist.

The insulating layer 212 may be formed on the core layer 211. In this case, the insulating layer 212 may include a prepreg layer formed with a preset thickness. The insulating layer 212 may include a trace embedded in a preset pattern by an embedded trace substrate (ETS) process. For example, a plurality of electrode pads, e.g., first and second electrode pads 221 and 222, may be embedded in the insulating layer 212 in a preset pattern. In this case, the ETS process refers to a technique of embedding a metal wiring pad for connection of an electronic element in an insulating layer, such as a prepreg layer. Herein, the prepreg layer may be a glass fiber or resin composite.

Therefore, the first and second electrode pads 221 and 222 may be embedded in the insulating layer 212 such that the top surface of the first and second electrode pads 221 and 222 is coplanar with the top surface of the insulating layer 212. However, the electronic device 1000 according to some embodiments is not limited only to the ETS.

For example, the substrate 210 may be identified as a single layer printed circuit board (PCB) with a wiring formed on only one surface thereof or a double layer PCB with a wiring formed on both surfaces thereof. In addition, three or more layers of Cu foils may be formed using an insulator, such as a prepreg layer, and three or more wiring layers may be formed according to the number of layers of Cu foils, thereby implementing a PCB of a multilayer wiring. Furthermore, the substrate 210 may be a rigid PCB or a flexible PCB.

The solder resist 240 may be formed on the insulating layer 212. The solder resist 240 may be formed on the substrate 210 so as to open a certain region including the first and second electrode pads 221 and 222. The solder resist 240 may be conformally coated on the insulating layer 212 and then selectively etched to open the certain region including the first and second electrode pads 221 and 222 on the substrate 210.

According to some embodiments, the first external electrode 131 of the capacitor 100 may be attached to the first electrode pad 221. The second external electrode 132 of the capacitor 100 may be attached to the second electrode pad 222. Particularly, the first electrode pad 221 may be electrically connected to the first external electrode 131 by the first solder 231. The second electrode pad 222 may be electrically connected to the second external electrode 132 by the second solder 232.

The first solder 231 may connect the first external electrode 131 to the first electrode pad 221, such that the top surface of the first solder 231 is formed at a level that is lower than or equal to the top of the first prevention portion 131*a*. The second solder 232 may connect the second external electrode 132 to the second electrode pad 222, such that the top surface of the second solder 232 is formed at a level that is lower than or equal to the top of the second prevention portion 132*a*. That is, the first prevention portion 131*a* may prevent the first solder 231 from being soldered to an upper portion of the first external electrode 131. The second prevention portion 132*a* may prevent the second solder 232 from being soldered to an upper portion of the second external electrode 132. Herein, the upper portion of the first external electrode 131 indicates a portion of the first external electrode 131 that is higher than a portion where the first prevention portion 131*a* is provided, and the upper portion of the second external electrode 132 indicates a portion of the second external electrode 132 that is higher than a portion where the second prevention portion 132*a* is provided.

By forming the first solder 231 and the second solder 232 up to the first prevention portion 131*a* and the second prevention portion 132*a* in the vertical direction (the Z direction), respectively, the heights of the first solder 231 and the second solder 232 in the vertical direction (the Z direction) may increase. By forming a limited volume of the first solder 231 and the second solder 232 up to the first prevention portion 131*a* and the second prevention portion 132*a*, respectively, the first solder 231 and the second solder 232 may be relatively much formed in a lower region of the capacitor 100. As a result, a clearance $G_1$ between the capacitor 100 and the substrate 210 may increase. Particularly, the clearance $G_1$ between the capacitor 100 and the substrate 210 may be in a range of about 20 μm to about 30 μm.

In an existing semiconductor package structure using an ETS, an electrode pad of the ETS is formed in the form of being embedded in an insulating layer, such as a prepreg layer, and a passive element, such as a capacitor, is connected thereto, and thus, a clearance for molding between the capacitor and the prepreg layer is very low, and accordingly, during a molding process, a void or the like may occur in a lower region of the capacitor.

According to some embodiments, by providing the first prevention portion 131*a* and the second prevention portion 132*a* to the first external electrode 131 and the second external electrode 132 of the capacitor 100, respectively, the first solder 231 and the second solder 232 may be much formed in the lower region of the capacitor 100. Therefore, the heights of the first solder 231 and the second solder 232 in the vertical direction (the Z direction) may increase. Accordingly, the clearance $G_1$ between the capacitor 100 and the substrate 210 may be ensured, and the occurrence of a void in the lower region of the capacitor 100 during a molding process may be reduced.

In addition, according to some embodiments, the height of a solder may be increased by also applying a prevention portion to a PCB or the like other than the ETS. Therefore, the clearance between the capacitor 100 and the PCB may be ensured, and the occurrence of a void in the lower region of the capacitor 100 during a molding process may be reduced.

Although FIG. 3 shows that the capacitor 100 in the electronic device 1000 is a die side capacitor (DSC) mounted on the substrate 210, the capacitor 100 is not limited thereto, and various embodiments in which the capacitor 100 is mounted on a substrate or the like are possible, such that the capacitor 100 is a land side capacitor (LSC) mounted beneath the substrate 210.

Figure 4:
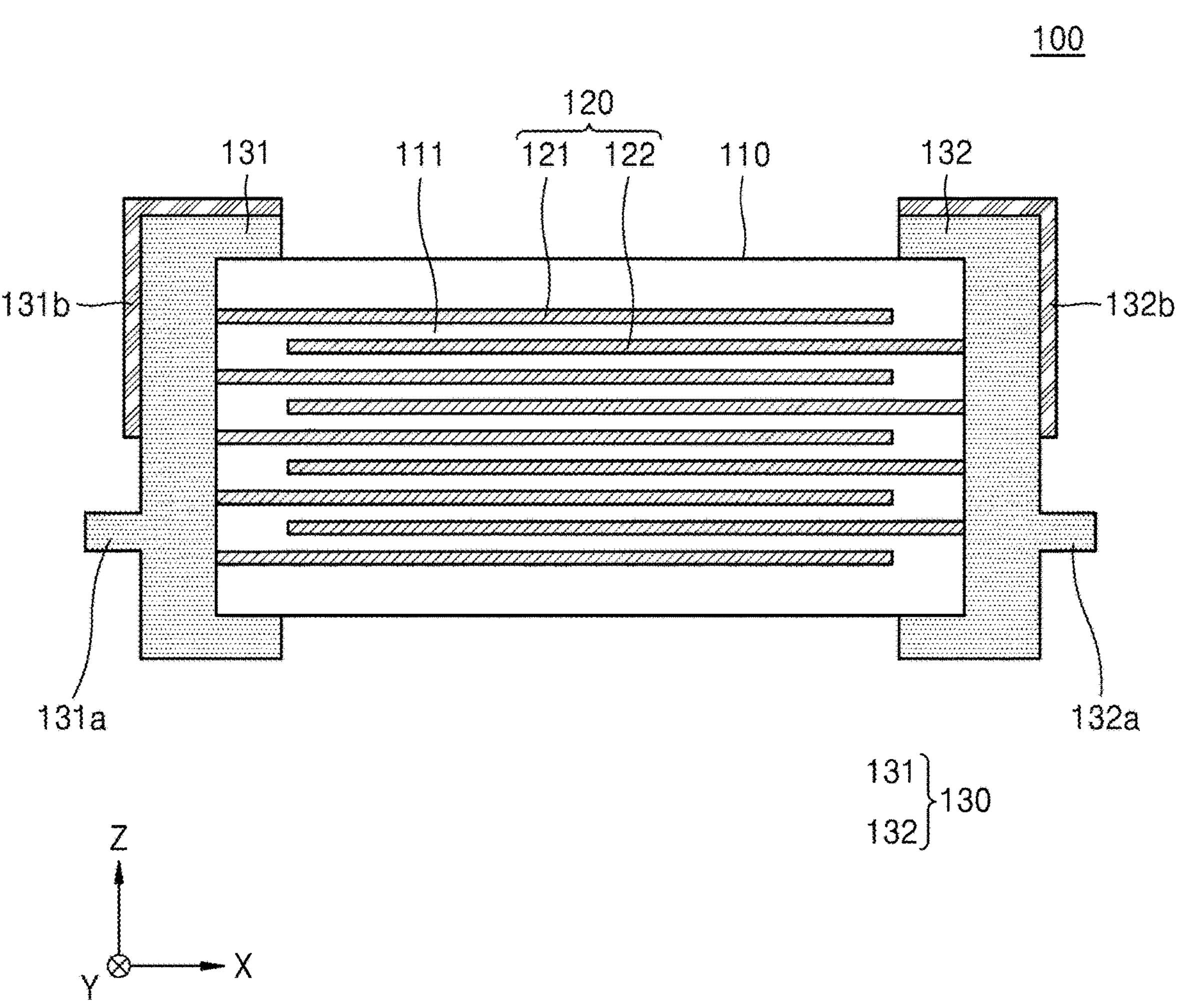
FIG. 4 is a cross-sectional view of a capacitor according to some embodiments.

FIG. 4 is a cross-sectional view of the capacitor 100 according to some embodiments.

Referring to FIG. 4, the capacitor 100 according to some embodiments may further include a cover portion 131*b* and 132*b*. In FIG. 4, like reference numerals in FIGS. 1 and 2 denote like elements, and thus their detailed description is omitted herein.

The cover portion 131*b* and 132*b* includes a first cover portion 131*b* and a second cover portion 132*b*. The first cover portion 131*b* may cover at least a portion of the first external electrode 131. The first cover portion 131*b* may cover at least a portion of the upper surface, an end surface, and both side surfaces of the first external electrode 131. The second cover portion 132*b* may cover at least a portion of the second external electrode 132. The second cover portion 132*b* may cover at least a portion of the upper surface, an end surface, and both side surfaces of the second external electrode 132. Herein, an end surface indicates a surface facing the first surface or the second surface of the ceramic main body 110, and both side surfaces indicate surfaces perpendicular to the first surface or the second surface and facing each other in the second horizontal direction (the Y direction).

The first cover portion 131*b* and the second cover portion 132*b* may include a metal or oxide. The first cover portion 131*b* and the second cover portion 132*b* may be formed of Ni plating or an oxide layer. The first cover portion 131*b* may prevent the first external electrode 131 from being soldered by the first solder 231 (see FIG. 3). The second cover portion 132*b* may prevent the second external electrode 132 from being soldered by the second solder 232 (see FIG. 3).

By preventing a limited volume of the first solder 231 and the second solder 232 from being formed up to upper portions of the first external electrode 131 and the second external electrode 132, respectively, the first solder 231 and the second solder 232 may be relatively much formed in the lower region of the capacitor 100. Accordingly, the clearance $G_1$ between the capacitor 100 and the substrate 210 may be ensured, and the occurrence of a void in the lower region of the capacitor 100 during a molding process may be reduced.

Figure 5:
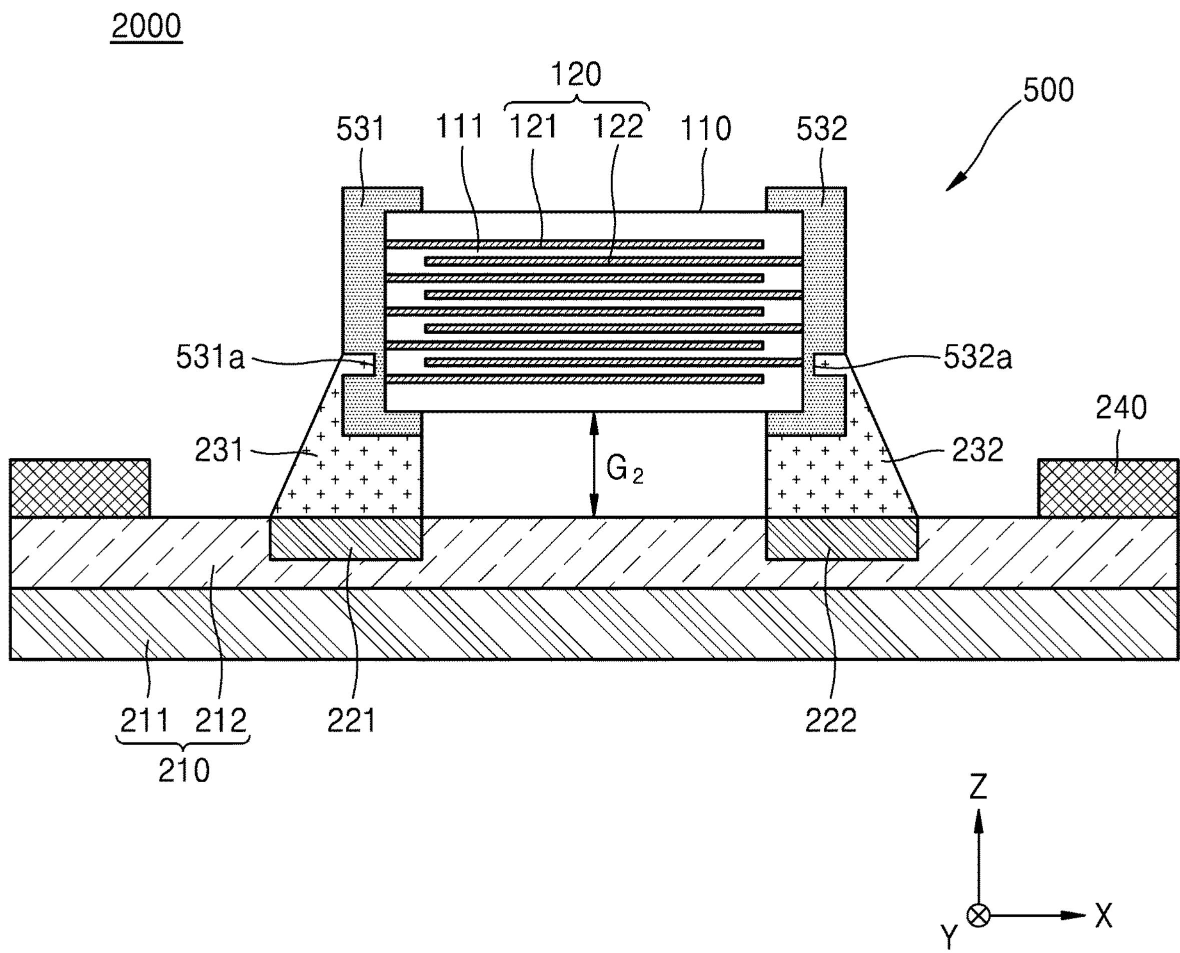
FIG. 5 is a cross-sectional view illustrating an electronic device with a capacitor mounted thereon, according to some embodiments.

FIG. 5 is a cross-sectional view illustrating an electronic device 2000 with a capacitor 500 mounted thereon, according to some embodiments.

Figure 6:
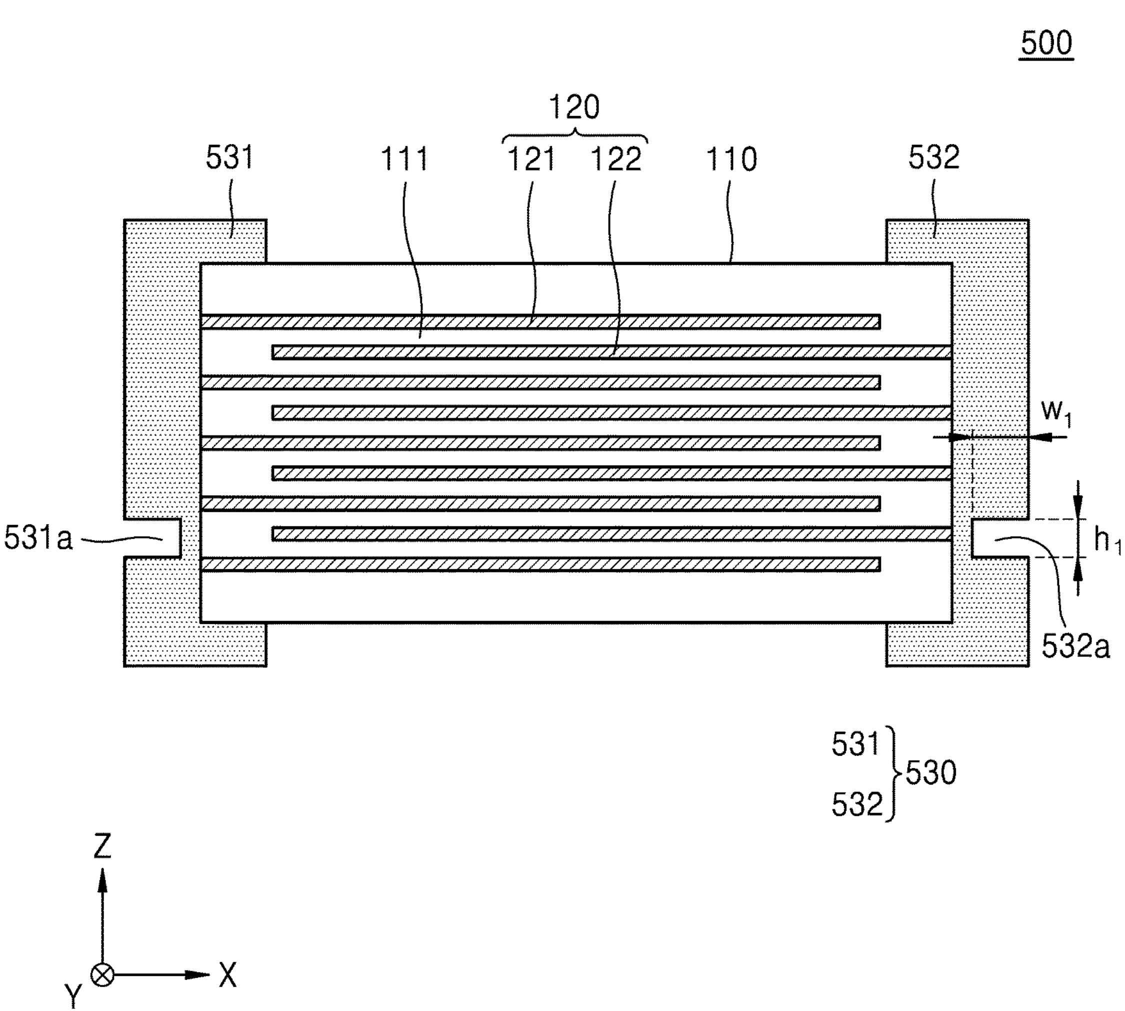
FIG. 6 is a cross-sectional view of the capacitor of FIG. 5, according to some embodiments.

FIG. 6 is a cross-sectional view of the capacitor 500 of FIG. 5, according to some embodiments.

Referring to FIGS. 5 and 6, the capacitor 500 according to some embodiments includes the ceramic main body 110, the internal electrode 120, and an external electrode 530. In addition, the electronic device 2000 with the capacitor 500 mounted thereon, according to some embodiments, includes the capacitor 500, the substrate 210, the plurality of solders, e.g., first and second solders 231 and 232, and the solder resist 240. In FIGS. 5 and 6, like reference numerals in FIGS. 1 to 3 denote like elements, and thus their detailed description is omitted herein.

According to some embodiments, the external electrode 530 includes a first external electrode 531 and a second external electrode 532. The first external electrode 531 and the second external electrode 532 may be directly connected to the first internal electrode 121 and the second internal electrode 122, respectively, to ensure electrical conduction between the inside and the outside. For example, the first external electrode 531 and the second external electrode 532 may include a conductive metal.

According to some embodiments, the external electrode 530 may be at both side surfaces of the ceramic main body 110 to be connected to the internal electrode 120. For example, the first external electrode 531 may be formed on the first surface of the ceramic main body 110 to be connected to the first internal electrode 121. The second external electrode 532 may be formed on the second surface of the ceramic main body 110 to be connected to the second internal electrode 122. In this case, the second surface may be an opposite surface to the first surface of the ceramic main body 110 in the first horizontal direction (the X direction).

According to some embodiments, each of the first external electrode 531 and the second external electrode 532 may extend to one or more surfaces among the upper and lower surfaces, both the end surfaces, and the side surfaces of the ceramic main body 110.

A prevention portion 531*a* and 532*a* of the capacitor 500 according to some embodiments includes a first prevention portion 531*a* and a second prevention portion 532*a*. The first prevention portion 531*a* may be provided to the first external electrode 531. The second prevention portion 532*a* may be provided to the second external electrode 532. Particularly, the first prevention portion 531*a* may be recessed in the inward direction of the ceramic main body 110 with respect to the first surface of the ceramic main body 110. In addition, the second prevention portion 532*a* may be recessed in the inward direction of the ceramic main body 110 with respect to the second surface of the ceramic main body 110.

According to some embodiments, the first prevention portion 531*a* and the second prevention portion 532*a* may be formed at the same level in the vertical direction (the Z direction). Particularly, the height from the lower surface of the first external electrode 531 to the first prevention portion 531*a* may be the same as the height from the lower surface of the second external electrode 532 to the second prevention portion 532*a*. However, the first prevention portion 531*a* and the second prevention portion 532*a* are not limited thereto and may be at different levels. For example, the height from the lower surface of the first external electrode 531 to the first prevention portion 531*a* may be greater or less than the height from the lower surface of the second external electrode 532 to the second prevention portion 532*a*.

According to some embodiments, the first prevention portion 531*a* may be parallel to the second prevention portion 532*a*. The first prevention portion 531*a* and the second prevention portion 532*a* may be parallel to each other and to the first horizontal direction (the X direction) and the second horizontal direction (the Y direction) of the ceramic main body 110. However, the first prevention portion 531*a* and the second prevention portion 532*a* are not limited thereto and may have a shape inclined at a certain angle with respect to the first horizontal direction (the X direction) or the second horizontal direction (the Y direction) of the ceramic main body 110. For example, as the first prevention portion 531*a* and the second prevention portion 532*a* are close to the ceramic main body 110, the heights of the first prevention portion 531*a* and the second prevention portion 532*a* in the vertical direction (the Z direction) may decrease. Alternatively, as the first prevention portion 531*a* and the second prevention portion 532*a* are close to the ceramic main body 110, the heights of the first prevention portion 531*a* and the second prevention portion 532*a* in the vertical direction (the Z direction) may increase.

According to some embodiments, the prevention portion 531*a* and 532*a* may be recessed with the certain height $h_1$ and depth $w_1$ in the inward direction of the ceramic main body 110. In this case, the height $h_1$ and depth $w_1$ of the prevention portion 531*a* and 532*a* may be formed in a range of about tens of micrometers. The height and depth of the first prevention portion 531*a* may be the same as the height and depth of the second prevention portion 532*a*, respectively, but are not limited thereto.

According to some embodiments, the first solder 231 of the electronic device 2000 may connect the first external electrode 531 to the first electrode pad 221, such that the top surface of the first solder 231 is formed at a level that is lower than or equal to the top of the first prevention portion 531*a*. The second solder 232 may connect the second external electrode 532 to the second electrode pad 222, such that the top surface of the second solder 232 is formed at a level that is lower than or equal to the top of the second prevention portion 532*a*. That is, the first prevention portion 531*a* may prevent the first solder 231 from being soldered to an upper portion of the first external electrode 531. The second prevention portion 532*a* may prevent the second solder 232 from being soldered to an upper portion of the second external electrode 532. Herein, the upper portion of the first external electrode 531 indicates a portion of the first external electrode 531 that is higher than a portion where the first prevention portion 531*a* is provided, and the upper portion of the second external electrode 532 indicates a portion of the second external electrode 532 that is higher than a portion where the second prevention portion 532*a* is provided.

By forming the first solder 231 and the second solder 232 up to the first prevention portion 531*a* and the second prevention portion 532*a* in the vertical direction (the Z direction), respectively, the heights of the first solder 231 and the second solder 232 in the vertical direction (the Z direction) may increase. By forming a limited volume of the first solder 231 and the second solder 232 up to the first prevention portion 531*a* and the second prevention portion 532*a*, respectively, the first solder 231 and the second solder 232 may be relatively much formed in a lower region of the capacitor 500. As a result, a clearance $G_2$ between the capacitor 500 and the substrate 210 may increase. Particularly, the clearance $G_2$ between the capacitor 500 and the substrate 210 may be in a range of about 20 μm to about 30 μm.

According to some embodiments, by providing the first prevention portion 531*a* and the second prevention portion 532*a* to the first external electrode 531 and the second external electrode 532 of the capacitor 500, respectively, the first solder 231 and the second solder 232 may be much formed in the lower region of the capacitor 500. Therefore, the heights of the first solder 231 and the second solder 232 in the vertical direction (the Z direction) may increase. Accordingly, the clearance $G_2$ between the capacitor 500 and the substrate 210 may be ensured, and the occurrence of a void in the lower region of the capacitor 500 during a molding process may be reduced.

Although FIG. 5 shows that the capacitor 500 in the electronic device 2000 is a DSC mounted on the substrate 210, the capacitor 500 is not limited thereto, and various embodiments in which the capacitor 500 is mounted on a substrate are possible, such that the capacitor 500 is an LSC mounted beneath the substrate 210.

Figure 7:
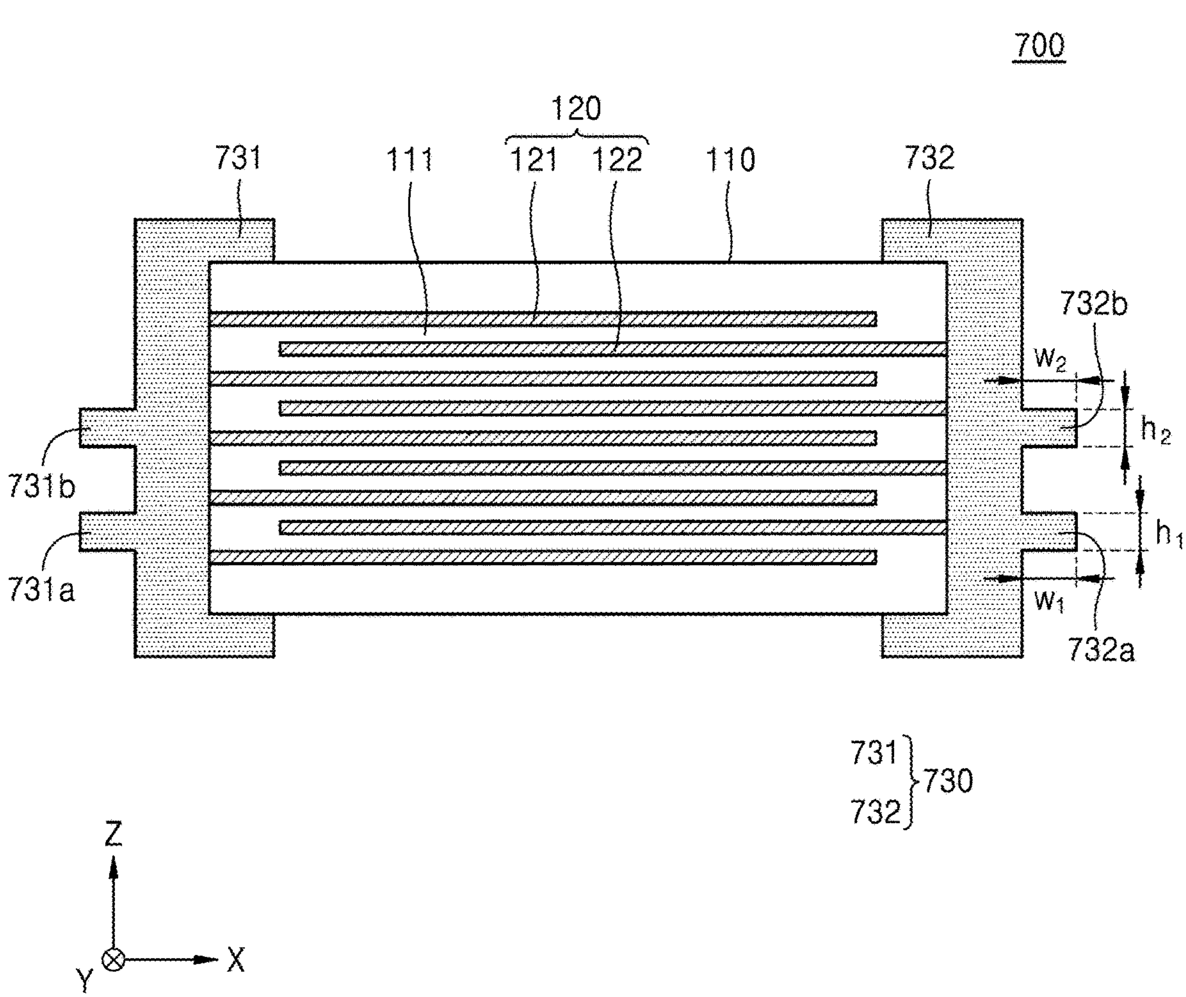
FIG. 7 is a cross-sectional view of a capacitor according to some embodiments.

FIG. 7 is a cross-sectional view of a capacitor 700 according to some embodiments.

In FIG. 7, like reference numerals in FIGS. 1 to 6 denote like elements, and thus their detailed description is omitted herein. In addition, an external electrode 730 is described by omitting a detailed description of portions common to those of the external electrodes 130 and 530.

Referring to FIG. 7, a prevention portion of the capacitor 700 according to some embodiments includes a lower prevention portion 731*a* and 732*a* and an upper prevention portion 731*b* and 732*b* separated on a plurality of external electrodes 730 in the vertical direction (the Z direction). For example, a first lower prevention portion 731*a* may be provided to a lower portion of a first external electrode 731, and a first upper prevention portion 731*b* may be provided to be separated by a certain distance from the first lower prevention portion 731*a* in the vertical direction (the Z direction). A second lower prevention portion 732*a* may be provided to a lower portion of a second external electrode 732, and a second upper prevention portion 732*b* may be provided to be separated by a certain distance from the second lower prevention portion 732*a* in the vertical direction (the Z direction).

Particularly, the first lower prevention portion 731*a* and the first upper prevention portion 731*b* may protrude in the outward direction of the ceramic main body 110 with respect to the first surface of the ceramic main body 110. In addition, the second lower prevention portion 732*a* and the second upper prevention portion 732*b* may protrude in the outward direction of the ceramic main body 110 with respect to the second surface of the ceramic main body 110.

According to some embodiments, the first lower prevention portion 731*a* and the second lower prevention portion 732*a* may be formed at the same level in the vertical direction (the Z direction). The first upper prevention portion 731*b* and the second upper prevention portion 732*b* may be formed at the same level in the vertical direction (the Z direction). However, the first lower prevention portion 731*a* and the second lower prevention portion 732*a* are not limited thereto and may be at different levels. In addition, the first upper prevention portion 731*b* and the second upper prevention portion 732*b* may be at different levels.

According to some embodiments, the first lower prevention portion 731*a* may be parallel to the second lower prevention portion 732*a*. The first lower prevention portion 731*a* and the second lower prevention portion 732*a* may be parallel to each other and to the first horizontal direction (the X direction) and the second horizontal direction (the Y direction) of the ceramic main body 110. However, the first lower prevention portion 731*a* and the second lower prevention portion 732*a* are not limited thereto and may have a shape inclined at a certain angle with respect to the first horizontal direction (the X direction) or the second horizontal direction (the Y direction) of the ceramic main body 110.

The first upper prevention portion 731*b* may be parallel to the second upper prevention portion 732*b*. The first upper prevention portion 731*b* and the second upper prevention portion 732*b* may be parallel to each other and to the first horizontal direction (the X direction) and the second horizontal direction (the Y direction) of the ceramic main body 110. However, the first upper prevention portion 731*b* and the second upper prevention portion 732*b* are not limited thereto and may have a shape inclined at a certain angle with respect to the first horizontal direction (the X direction) or the second horizontal direction (the Y direction) of the ceramic main body 110.

According to some embodiments, the first lower prevention portion 731*a* and the second lower prevention portion 732*a* may protrude with the certain height $h_1$ and depth $w_1$ in the outward direction of the ceramic main body 110. The first upper prevention portion 731*b* and the second upper prevention portion 732*b* may protrude with a certain height $h_2$ and depth $w_2$ in the outward direction of the ceramic main body 110. In this case, the heights $h_1$ and $h_2$ and the depths $w_1$ and $w_2$ of the first lower prevention portion 731*a*, the second lower prevention portion 732*a*, the first upper prevention portion 731*b*, and the second upper prevention portion 732*b* may be in a range of about tens of micrometers. The lower prevention portion 731*a* and 732*a* may have a height or depth different from that of the upper prevention portion 731*b* and 732*b*.

However, the first lower prevention portion 731*a*, the second lower prevention portion 732*a*, the first upper prevention portion 731*b*, and the second upper prevention portion 732*b* are not limited thereto, the first lower prevention portion 731*a* and the second lower prevention portion 732*a* may have the same height and depth, and the first upper prevention portion 731*b* and the second upper prevention portion 732*b* may have the same height and depth.

According to some embodiments, when the capacitor 700 is attached to the substrate 210 (see FIG. 3), the top surface of the first solder 231 (see FIG. 3) may be formed to be lower than or equal to the top of the first upper prevention portion 731*b*. In addition, the top surface of the second solder 232 may be formed to be lower than or equal to the top of the second upper prevention portion 732*b*. That is, the upper prevention portion 731*b* and 732*b* may prevent the first and second solders 231 and 232 (see FIG. 3) from being soldered to an upper portion of the external electrode 730. In this case, the upper portion of the external electrode 730 indicates a portion of the external electrode 730 that is higher than a portion where the upper prevention portion 731*b* and 732*b* is provided.

By forming the first and second solders 231 and 232 (see FIG. 3) up to the upper prevention portion 731*b* and 732*b* in the vertical direction (the Z direction), respectively, the height of the first and second solders 231 and 232 (see FIG. 3) in the vertical direction (the Z direction) may increase. By relatively much forming the first and second solders 231 and 232 (see FIG. 3) in a lower region of the capacitor 700, the height of the first and second solders 231 and 232 (see FIG.

3) in the vertical direction (the Z direction) may increase. Accordingly, the clearance between the capacitor 700 and the substrate 210 may be ensured, and the occurrence of a void in the lower region of the capacitor 700 during a molding process may be reduced.

Figure 8:
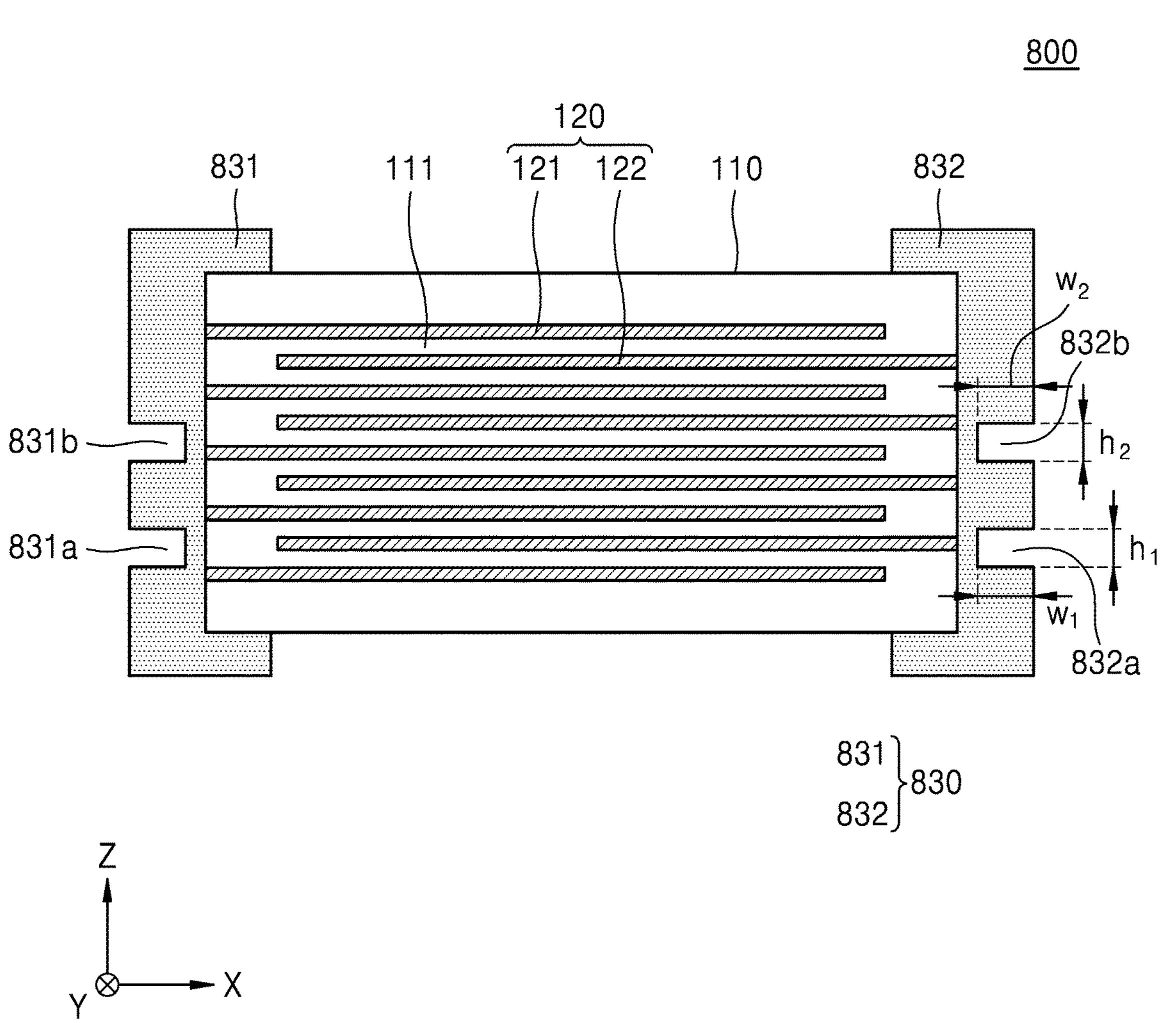
FIG. 8 is a cross-sectional view of a capacitor according to some embodiments.

FIG. 8 is a cross-sectional view of a capacitor 800 according to some embodiments.

In FIG. 8, like reference numerals in FIGS. 1 to 6 denote like elements, and thus their detailed description is omitted herein. In addition, an external electrode 830 is described by omitting a detailed description of portions common to those of the external electrodes 130 and 530.

Referring to FIG. 8, a prevention portion of the capacitor 800 according to some embodiments includes a lower prevention portion 831*a* and 832*a* and an upper prevention portion 831*b* and 832*b* separated on a plurality of external electrodes 830 in the vertical direction (the Z direction). For example, a first lower prevention portion 831*a* may be provided to a lower portion of a first external electrode 831, and a first upper prevention portion 831*b* may be provided to be separated by a certain distance from the first lower prevention portion 831*a* in the vertical direction (the Z direction). A second lower prevention portion 832*a* may be provided to a lower portion of a second external electrode 832, and a second upper prevention portion 832*b* may be provided to be separated by a certain distance from the second lower prevention portion 832*a* in the vertical direction (the Z direction).

Particularly, the first lower prevention portion 831*a* and the first upper prevention portion 831*b* may be recessed in the inward direction of the ceramic main body 110 with respect to the first surface of the ceramic main body 110. In addition, the second lower prevention portion 832*a* and the second upper prevention portion 832*b* may be recessed in the inward direction of the ceramic main body 110 with respect to the second surface of the ceramic main body 110.

According to some embodiments, the first lower prevention portion 831*a* and the second lower prevention portion 832*a* may be formed at the same level in the vertical direction (the Z direction). The first upper prevention portion 831*b* and the second upper prevention portion 832*b* may be formed at the same level in the vertical direction (the Z direction). However, the first lower prevention portion 831*a* and the second lower prevention portion 832*a* are not limited thereto and may be at different levels. In addition, the first upper prevention portion 831*b* and the second upper prevention portion 832*b* may be at different levels.

According to some embodiments, the first lower prevention portion 831*a* may be parallel to the second lower prevention portion 832*a*. The first lower prevention portion 831*a* and the second lower prevention portion 832*a* may be parallel to each other and to the first horizontal direction (the X direction) and the second horizontal direction (the Y direction) of the ceramic main body 110. However, the first lower prevention portion 831*a* and the second lower prevention portion 832*a* are not limited thereto and may have a shape inclined at a certain angle with respect to the first horizontal direction (the X direction) or the second horizontal direction (the Y direction) of the ceramic main body 110.

The first upper prevention portion 831*b* may be parallel to the second upper prevention portion 832*b*. The first upper prevention portion 831*b* and the second upper prevention portion 832*b* may be parallel to each other and to the first horizontal direction (the X direction) and the second horizontal direction (the Y direction) of the ceramic main body 110. However, the first upper prevention portion 831*b* and the second upper prevention portion 832*b* are not limited thereto and may have a shape inclined at a certain angle with respect to the first horizontal direction (the X direction) or the second horizontal direction (the Y direction) of the ceramic main body 110.

According to some embodiments, the first lower prevention portion 831*a* and the second lower prevention portion 832*a* may be recessed with the certain height $h_1$ and depth $w_1$ in the inward direction of the ceramic main body 110. The first upper prevention portion 831*b* and the second upper prevention portion 832*b* may be recessed with the certain height $h_2$ and depth $w_2$ in the inward direction of the ceramic main body 110. In this case, the heights $h_1$ and $h_2$ and the depths $w_1$ and $w_2$ of the first lower prevention portion 831*a*, the second lower prevention portion 832*a*, the first upper prevention portion 831*b*, and the second upper prevention portion 832*b* may be in a range of about tens of μm. The lower prevention portion 831*a* and 832*a* may have a height or depth different from that of the upper prevention portion 831*b* and 832*b*.

However, the first lower prevention portion 831*a*, the second lower prevention portion 832*a*, the first upper prevention portion 831*b*, and the second upper prevention portion 832*b* are not limited thereto, the first lower prevention portion 831*a* and the second lower prevention portion 832*a* may have the same height and depth, and the first upper prevention portion 831*b* and the second upper prevention portion 832*b* may have the same height and depth.

According to some embodiments, when the capacitor 800 is attached to the substrate 210 (see FIG. 3), the top surface of the first solder 231 (see FIG. 3) may be formed to be lower than or equal to the top of the first upper prevention portion 831*b*. In addition, the top surface of the second solder 232 may be formed to be lower than or equal to the top of the second upper prevention portion 832*b*. That is, the upper prevention portion 831*b* and 832*b* may prevent the first and second solders 231 and 232 (see FIG. 3) from being soldered to an upper portion of the external electrode 830. In this case, the upper portion of the external electrode 830 indicates a portion of the external electrode 830 that is higher than a portion where the upper prevention portion 831*b* and 832*b* is provided.

By forming the first and second solders 231 and 232 (see FIG. 3) up to the upper prevention portion 831*b* and 832*b* in the vertical direction (the Z direction), respectively, the height of the first and second solders 231 and 232 (see FIG. 3) in the vertical direction (the Z direction) may increase. By relatively much forming the first and second solders 231 and 232 (see FIG. 3) in a lower region of the capacitor 800, the height of the first and second solders 231 and 232 (see FIG. 3) in the vertical direction (the Z direction) may increase. Accordingly, the clearance between the capacitor 800 and the substrate 210 may be ensured, and the occurrence of a void in the lower region of the capacitor 800 during a molding process may be reduced.

Figure 9:
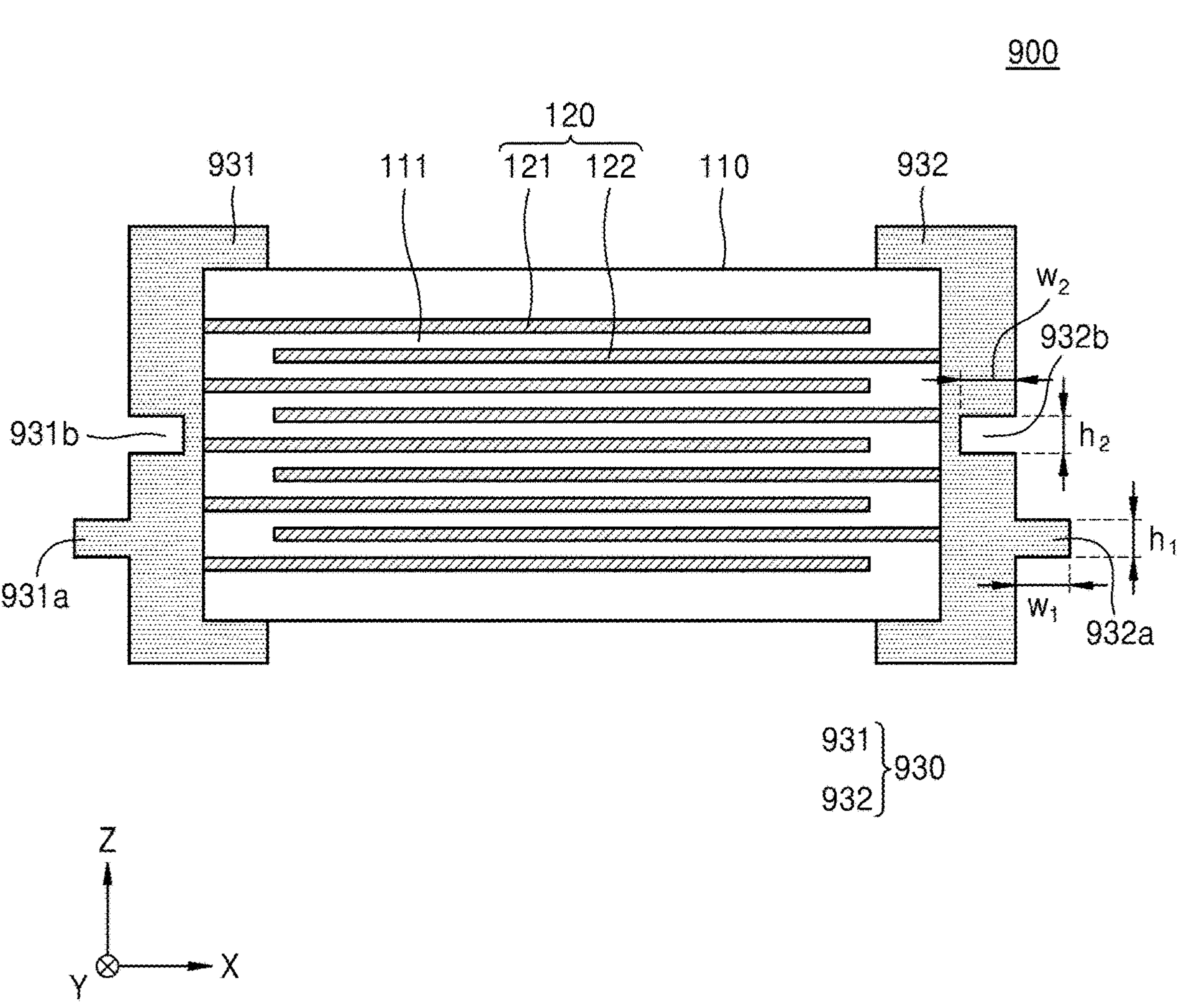
FIG. 9 is a cross-sectional view of a capacitor according to some embodiments.

FIG. 9 is a cross-sectional view of a capacitor 900 according to some embodiments.

In FIG. 9, like reference numerals in FIGS. 1 to 6 denote like elements, and thus their detailed description is omitted herein. In addition, an external electrode 930 is described by omitting a detailed description of portions common to those of the external electrodes 130 and 530.

Referring to FIG. 9, a prevention portion of the capacitor 900 according to some embodiments includes a lower prevention portion 931*a* and 932*a* and an upper prevention portion 931*b* and 932*b* separated on a plurality of external electrodes 930 in the vertical direction (the Z direction). For example, a first lower prevention portion 931*a* may be provided to a lower portion of a first external electrode 931, and a first upper prevention portion 931*b* may be provided to be separated by a certain distance from the first lower prevention portion 931*a* in the vertical direction (the Z direction). A second lower prevention portion 932*a* may be provided to a lower portion of a second external electrode 932, and a second upper prevention portion 932*b* may be provided to be separated by a certain distance from the second lower prevention portion 932*a* in the vertical direction (the Z direction).

Particularly, the first lower prevention portion 931*a* and the second lower prevention portion 932*a* may protrude in the outward direction of the ceramic main body 110 with respect to the first and second surfaces of the ceramic main body 110, respectively. In addition, the first upper prevention portion 931*b* and the second upper prevention portion 932*b* may be recessed in the inward direction of the ceramic main body 110 with respect to the first and second surfaces of the ceramic main body 110, respectively. However, the lower prevention portion 931*a* and 932*a* and the upper prevention portion 931*b* and 932*b* are not limited thereto, the lower prevention portion 931*a* and 932*a* may be recessed in the inward direction of the ceramic main body 110, and the upper prevention portion 931*b* and 932*b* may protrude in the outward direction of the ceramic main body 110.

According to some embodiments, the first lower prevention portion 931*a* and the second lower prevention portion 932*a* may be formed at the same level in the vertical direction (the Z direction). The first upper prevention portion 931*b* and the second upper prevention portion 932*b* may be formed at the same level in the vertical direction (the Z direction). However, the first lower prevention portion 931*a* and the second lower prevention portion 932*a* are not limited thereto and may be at different levels. In addition, the first upper prevention portion 931*b* and the second upper prevention portion 932*b* may be at different levels.

According to some embodiments, the first lower prevention portion 931*a* may be parallel to the second lower prevention portion 932*a*. The first lower prevention portion 931*a* and the second lower prevention portion 932*a* may be parallel to each other and to the first horizontal direction (the X direction) and the second horizontal direction (the Y direction) of the ceramic main body 110. However, the first lower prevention portion 931*a* and the second lower prevention portion 932*a* are not limited thereto and may have a shape inclined at a certain angle with respect to the first horizontal direction (the X direction) or the second horizontal direction (the Y direction) of the ceramic main body 110.

The first upper prevention portion 931*b* may be parallel to the second upper prevention portion 932*b*. The first upper prevention portion 931*b* and the second upper prevention portion 932*b* may be parallel to each other and to the first horizontal direction (the X direction) and the second horizontal direction (the Y direction) of the ceramic main body 110. However, the first upper prevention portion 931*b* and the second upper prevention portion 932*b* are not limited thereto and may have a shape inclined at a certain angle with respect to the first horizontal direction (the X direction) or the second horizontal direction (the Y direction) of the ceramic main body 110.

According to some embodiments, the first lower prevention portion 931*a* and the second lower prevention portion 932*a* may protrude with the certain height $h_1$ and depth $w_1$ in the outward direction of the ceramic main body 110. The first upper prevention portion 931*b* and the second upper prevention portion 932*b* may be recessed with the certain height $h_2$ and depth $w_2$ in the inward direction of the ceramic main body 110. In this case, the heights $h_1$ and $h_2$ and the depths $w_1$ and $w_2$ of the first lower prevention portion 931*a*, the second lower prevention portion 932*a*, the first upper prevention portion 931*b*, and the second upper prevention portion 932*b* may be in a range of about tens of μm. The lower prevention portion 931*a* and 932*a* may have a height or depth different from that of the upper prevention portion 931*b* and 932*b*.

However, the first lower prevention portion 931*a*, the second lower prevention portion 932*a*, the first upper prevention portion 931*b*, and the second upper prevention portion 932*b* are not limited thereto, the first lower prevention portion 931*a* and the second lower prevention portion 932*a* may have the same height and depth, and the first upper prevention portion 931*b* and the second upper prevention portion 932*b* may have the same height and depth.

According to some embodiments, when the capacitor 900 is attached to the substrate 210 (see FIG. 3), the top surface of the first solder 231 (see FIG. 3) may be formed to be lower than or equal to the top of the first upper prevention portion 931*b*. In addition, the top surface of the second solder 232 may be formed to be lower than or equal to the top of the second upper prevention portion 932*b*. That is, the upper prevention portion 931*b* and 932*b* may prevent the first and second solders 231 and 232 (see FIG. 3) from being soldered to an upper portion of the external electrode 930. In this case, the upper portion of the external electrode 930 indicates a portion of the external electrode 930 that is higher than a portion where the upper prevention portion 931*b* and 932*b* is provided.

By forming the first and second solders 231 and 232 (see FIG. 3) up to the upper prevention portion 931*b* and 932*b* in the vertical direction (the Z direction), respectively, the height of the first and second solders 231 and 232 (see FIG. 3) in the vertical direction (the Z direction) may increase. By relatively much forming the first and second solders 231 and 232 (see FIG. 3) in a lower region of the capacitor 900, the height of the first and second solders 231 and 232 (see FIG. 3) in the vertical direction (the Z direction) may increase. Accordingly, the clearance between the capacitor 900 and the substrate 210 may be ensured, and the occurrence of a void in the lower region of the capacitor 800 during a molding process may be reduced.

Although FIGS. 7 to 9 show that each of the external electrodes 730, 830, and 930 of the capacitors 700, 800, and 900 includes two prevention portions separated from each other in the vertical direction (the Z direction), each of the external electrodes 730, 830, and 930 is not limited thereto and may include three or more prevention portions in accordance with circumstances. When three or more prevention portions are included, the first and second solders 231 and 232 (see FIG. 3) may be formed up to the top prevention portion in the vertical direction (the Z direction). According to the number of prevention portions and the forming position of a solder, the height of the solder in the vertical direction (the Z direction) may be variously designed.

In addition, the capacitors 500, 700, 800, and 900 according to the embodiments of FIGS. 6 to 9 may also further include the cover portion 131*b* and 132*b* shown in FIG. 4. A description of the cover portion 131*b* and 132*b* is the same as made above, and thus, a detailed description thereof is omitted herein.

While this disclosure contains many specific embodiment details, these should not be construed as limitations on the scope of what may be claimed. Certain features that are described in this disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a combination can in some cases be excised from the combination, and the combination may be directed to a subcombination or variation of a subcombination.

While the disclosure has been particularly shown and described with reference to embodiments thereof, it will be understood that various changes in form and details may be made therein without departing from the spirit and scope of the following claims.

What is claimed is:

1. A capacitor comprising:

a ceramic main body;

an internal electrode inside the ceramic main body; and a plurality of external electrodes respectively on a first surface and a second surface that are opposite to each other in a horizontal direction of the ceramic main body; and a cover portion covering at least a portion of the plurality of external electrodes, wherein each external electrode of the plurality of external electrodes comprises one or more prevention portions of a same material as the plurality of external electrodes protruding in an outward direction of the ceramic main body or recessed in an inward direction of the ceramic main body, wherein each of the one or more prevention portions extends on at least two outer surfaces of each external electrode of the plurality of external electrodes, and wherein the one or more prevention portions have a first section having a rectangular cuboid shape.

2. The capacitor of claim 1, wherein the plurality of external electrodes comprise a first external electrode on the first surface of the ceramic main body and a second external electrode on the second surface of the ceramic main body, the one or more prevention portions comprise a first prevention portion included in the first external electrode and a second prevention portion included in the second external electrode, and the first prevention portion and the second prevention portion are at a same level.

3. The capacitor of claim 2, wherein the first prevention portion and the second prevention portion are parallel to the horizontal direction of the ceramic main body.

4. The capacitor of claim 1, wherein the one or more prevention portions comprise a lower prevention portion and an upper prevention portion that are provided to each external electrode of the plurality of external electrodes and separated from each other in a vertical direction.

5. The capacitor of claim 4, wherein the lower prevention portion and the upper prevention portion are integrally formed with the plurality of external electrodes and protrude in the outward direction of the ceramic main body or are recessed in the inward direction of the ceramic main body.

6. The capacitor of claim 4, wherein one of the lower prevention portion and the upper prevention portion protrudes in the outward direction of the ceramic main body, and another of the lower prevention portion and the upper prevention portion is recessed in the inward direction of the ceramic main body.

7. The capacitor of claim 4, wherein the lower prevention portion and the upper prevention portion have different heights or depths.

8. The capacitor of claim 1, wherein the cover portion comprises a metal or oxide.

9. A capacitor comprising:

a ceramic main body comprising a plurality of dielectric layers stacked in a vertical direction;

a plurality of internal electrodes alternately disposed with the plurality of dielectric layers inside the ceramic main body;

a first external electrode on a first surface of the ceramic main body;

a second external electrode on a second surface that is opposite to the first surface in a horizontal direction; and a cover portion covering at least a portion of each of the first external electrode and the second external electrode, wherein the first external electrode comprises one or more first prevention portions of a same material as the first external electrode protruding in an outward direction of the ceramic main body or recessed in an inward direction of the ceramic main body, wherein the second external electrode comprises one or more second prevention portions of a same material as the second external electrode protruding in the outward direction of the ceramic main body or recessed in the inward direction of the ceramic main body, wherein each of the one or more first prevention portions extends on at least two outer surfaces of the first external electrode, wherein each of the one or more second prevention portions extends on at least two outer surfaces of the second external electrode, and wherein the one or more first prevention portions and the one or more second prevention portions have a first section having a rectangular cuboid shape.

10. The capacitor of claim 9, wherein the one or more first prevention portions and the one or more second prevention portions are at a same level.

11. The capacitor of claim 9, wherein the one or more first prevention portions and the one or more second prevention portions are parallel to the horizontal direction of the ceramic main body.

12. The capacitor of claim 9, wherein the one or more first prevention portions comprise a first lower prevention portion and a first upper prevention portion that are provided to the first external electrode and separated from each other in the vertical direction, and the one or more second prevention portions comprise a second lower prevention portion and a second upper prevention portion that are provided to the second external electrode and separated from each other in the vertical direction.

13. The capacitor of claim 12, wherein the first lower prevention portion, the first upper prevention portion, the second lower prevention portion, and the second upper prevention portion have different heights or depths.

14. The capacitor of claim 9, wherein the cover portion comprises a metal or oxide.

15. An electronic device, the electronic device comprising:

a substrate comprising a core layer and an insulating layer formed on the core layer;

an electrode pad embedded in the insulating layer;

a solder resist coated on the substrate and forming an open area on the substrate;

a capacitor on the substrate; and a solder connecting the substrate to the capacitor, wherein the capacitor comprises:

a ceramic main body;

an internal electrode inside the ceramic main body;

a plurality of external electrodes respectively on a first surface of the ceramic main body and a second surface that is opposite to the first surface; and a cover portion covering at least a portion of the plurality of external electrodes, wherein the plurality of external electrodes are connected to the electrode pad through the solder, and wherein each external electrode of the plurality of external electrodes comprises one or more prevention portions of a same material as the plurality of external electrodes protruding in an outward direction of the ceramic main body or recessed in an inward direction of the ceramic main body, wherein each of the one or more prevention portions extends on at least two outer surfaces of each external electrode of the plurality of external electrodes, and wherein the one or more prevention portions have a first section having a rectangular cuboid shape.

16. The electronic device of claim 15, wherein a top surface of the electrode pad is coplanar with a top surface of the substrate.

17. The electronic device of claim 16, wherein the solder connects the plurality of external electrodes to the electrode pad, and the top surface of the solder is lower than or at a same level as a top surface of a highest prevention portion among the one or more prevention portions.

18. The electronic device of claim 17, wherein the one or more prevention portions comprise a first prevention portion formed on a first external electrode on the first surface of the ceramic main body and a second prevention portion formed on a second external electrode on the second surface of the ceramic main body, and the first prevention portion and the second prevention portion are formed to be parallel to each other at a same level.

* * * * *